United States Patent
Albertini et al.

[11] Patent Number: 5,842,269
[45] Date of Patent: Dec. 1, 1998

[54] PROCESSES FOR PRODUCING A DOUBLE MAGNETIC HEAD HAVING HEAD GAPS WITH OPPOSITE AZIMUTHS

[75] Inventors: Jean-Baptiste Albertini, Grenoble; Gérard Barrois, le Fontanil; Pierre Gaud, Coublevie; Henri Sibuet, le Fontanil, all of France

[73] Assignee: Commissariat a l'Energie Atomique, Paris, France

[21] Appl. No.: 818,936

[22] Filed: Mar. 17, 1997

[30] Foreign Application Priority Data

Apr. 4, 1996 [FR] France ................................ 96 04241

[51] Int. Cl.⁶ ..................................................... G11B 5/127
[52] U.S. Cl. ..................................... 29/603.13; 29/603.07; 29/603.15; 29/603.01; 360/121; 360/124
[58] Field of Search ........................... 29/603.07, 603.13, 29/603.15, 603.01; 360/121, 124

[56] References Cited

FOREIGN PATENT DOCUMENTS 0 233 086  8/1987  European Pat. Off. .
0 614 173  9/1994  European Pat. Off. .

OTHER PUBLICATIONS

Patent Abstracts of Japan, vol. 13, No. 203, (P–870), May 15, 1989, & JP–64–23413, Jan. 26, 1989.
Patent Abstracts of Japan, vol. 10, No. 254, (P–492), Aug. 30, 1986, JP–61 080509, Apr. 24, 1986.
Patent Abstracts of Japan, vol. 9, No. 157, (P–369), Jul. 2, 1985, JP–60 035313, Feb. 23, 1985.
Patent Abstracts of Japan, vol. 18, No. 172, (P–1715), Mar. 23, 1994, & JP–05 334627, Dec. 17, 1993.
Patent Abstracts of Japan, vol. 10, no. 334, (P–515), Nov. 13, 1986, JP–61 137214, Jun. 24, 1986.
Patent Abstracts of Japan, vol. 95, No. 11, & JP–07 296325, Nov. 10, 1995.
Patent Abstracts of Japan, vol. 9, No. 262 (P–398), Oct. 19, 1985, & JP–60 111311, Jun. 17, 1985.

*Primary Examiner*—Timothy V. Eley
*Assistant Examiner*—Benjamin M Halpern
*Attorney, Agent, or Firm*—Oblon, Spivak, McClelland, Maier & Neustadt, P.C.

[57] ABSTRACT

A process for producing a double magnetic head with two head gaps with opposite azimuths by forming a first magnetic head with a first head gap having a predetermined inclination angle on a first substrate and a second magnetic head having a second head gap with a second inclination angle on a second substrate and etching a first recess along the first head. The second head is received in the first recess and a second recess is etched along the second head to receive the first head. Subsequently, one of the heads is reversed and the first head is fitted into the second recess and the second head into the first recess so that the first and second inclination angles are opposed in a common reference frame thereby providing opposite azimuth angles.

8 Claims, 6 Drawing Sheets

PROCESSES FOR PRODUCING A DOUBLE MAGNETIC HEAD HAVING HEAD GAPS WITH OPPOSITE AZIMUTHS

BACKGROUND OF THE INVENTION

The present invention relates to processes for producing a double magnetic head having head gaps with opposite azimuths. It is used in the magnetic recording of information, particularly in mass market or professional video recording, in bulk memories in computer science, in the storage of data on tape or disk, etc.

DISCUSSION OF BACKGROUND

A magnetic recording support or medium for video recording, data backup or computer memory, comprises numerous tracks on which are written informations in the form of magnetic domains.

In order to increase the information density, there is an increase not only to the number of informations per length unit, but also the number of tracks. For this purpose there is a reduction in the width of the tracks and simultaneously a reduction to the gap separating them until the tracks become contiguous.

In order to avoid any crosstalk problem on reading, the informations are written on two adjacent tracks in an inclined manner with opposite inclination angles. These inclination angles are known as azimuth angles. The reading gap head must then have an azimuth, whose value corresponds to the inclination of the recording. The azimuth of the head gap must be very precise (e.g. 20±0.15° in the new digital video cassette or DVC standard).

Figure 1:
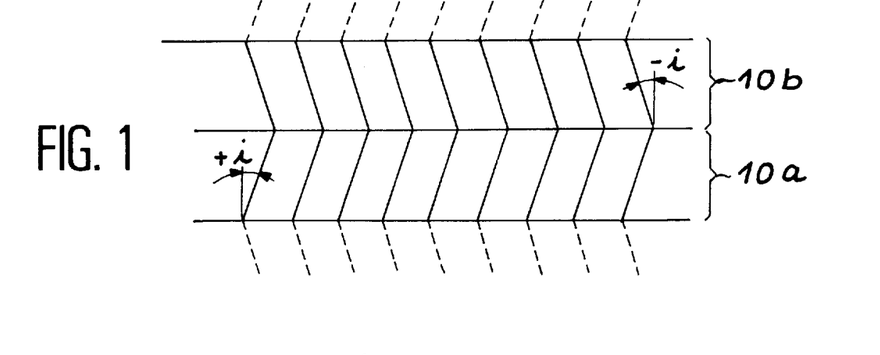
FIG. 1, already described, shows two adjacent recording tracks.

FIG. 1 shows a recording medium with tow tracks $10a$ and $10b$, whose writing directions through the head gap (represented by oblique lines) form with the perpendicular to the general direction of the tracks azimuth angles +i for track $10a$ and −i for track $10b$.

Figure 2:
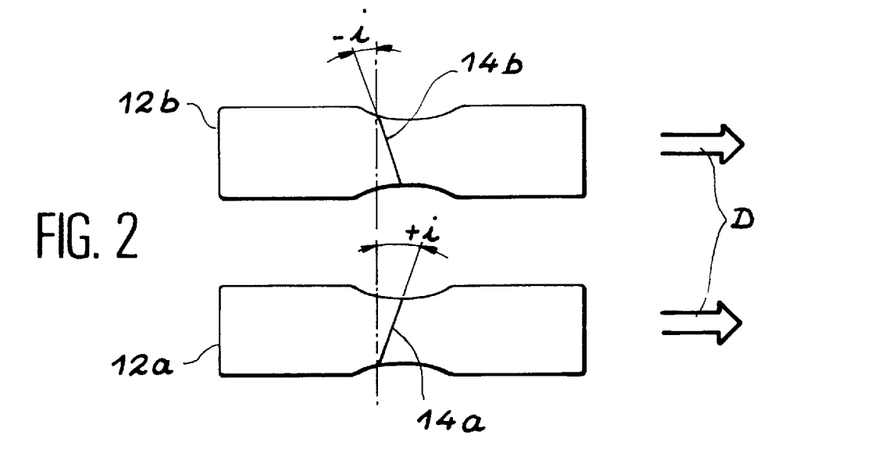
FIG. 2, already described, shows two heads with opposite azimuths.

FIG. 2 shows two magnetic heads $12a$, $12b$ with gaps $14a$, $14b$ having azimuth angles of respectively +i and −i. The displacement direction of these heads is designated D.

Figure 3:
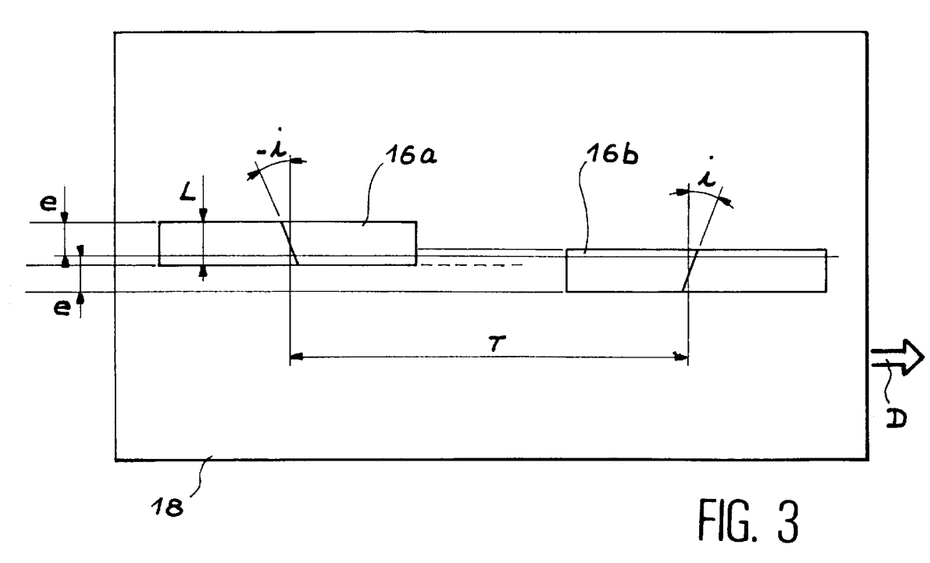
FIG. 3, already described, shows an assembly of two displaced heads.

In reality, a group of two heads azimuthed in opposite directions does not generally occur in the form of two juxtaposed heads, as in FIG. 2, otherwise the tracks read would not be contiguous. It occurs in the form of two mutually displaced heads, as illustrated in FIG. 3. This permits a tighter arrangement of the tracks. In this arrangement, the two heads $16a$, $16b$ in each case have an azimuthed gap of total width L, the two head gaps being separated by a distance T. Each head can then move over a recording track of width e, said tracks being quasi-contiguous. It is e.g. possible to have L=7 microns, T=550 microns and e=6.7 microns.

The two magnetic heads $16a$, $16b$ incorporate not shown means, such as a magnetic circuit and a conductor coil. All these means form a double head with opposite azimuths carrying the general reference 18 in FIG. 3. Its displacement direction is again symbolized by the arrow D.

Figure 4:
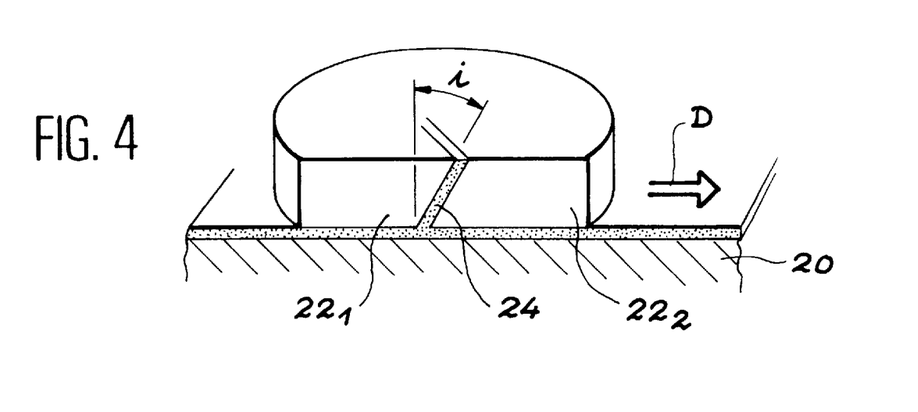
FIG. 4, already described, shows a detail of a known head with an azimuthed head gap.

In order to obtain such a double head, generally two independent heads are produced having head gaps inclined in opposite directions and said two heads are installed on a single support. An azimuthed magnetic head is shown in exemplified manner in FIG. 4, where there is a monocrystalline substrate 20, two pole pieces $22_1$, $22_2$ separated by an amagnetic gap 24, which is inclined by an angle i. This inclination is e.g. obtained by taking advantage of the monocrystalline character of the substrate and by carrying out anisotropic etching in a crystallographic plane of the substrate. This process is described in FR-A-2 664 729 (or W0-92/02015).

This process for the production of double heads consisting of grouping two single heads is not satisfactory. Thus, it is difficult to correctly orient the two heads so that their gaps have in each case the desired azimuth and it is also difficult to correctly mutually position the two heads, so that each of them correctly cooperates with the tracks. The dimensions given in connection with FIG. 3, particularly the width of 6.7 microns, show that they represent extremely fine settings. All these fitting difficulties give rise to significant extra costs compared with that of a single head.

To these alignment difficulties is added a problem linked with the space occupied by the heads, which makes it difficult to move together the head gaps so as to have a good contact between the tape and each head (the "good contact" zone being very localized). It would also be of interest to minimize the distance separating the two heads so as to simplify the writing or recording of two adjacent tracks without any space loss (linked with the spatial shift) at the start and end of the track. Thus, to avoid a space loss in the information storage at the start and end of the track, it is necessary to desynchronize the writing of one head with respect to the other in order to compensate the spatial shift between the two heads. Thus, a compromise must be found between the recording simplicity and the compactness of information storage.

Heads using thin film technology and microelectronics certainly offer interesting advantages, but the production the same substrate of two opposite azimuth angles in such a technology is a problem which has not hitherto been satisfactorily solved.

The object of the present invention is to propose a process for the production of double magnetic heads using said thin film technology and microelectronics and leading to a very simple installation and an automatic setting of the position and orientation of the heads.

SUMMARY OF THE INVENTION

According to the invention, on the same substrate or two independent substrates, magnetic heads are initially produced using thin film technology, said heads being subdivided into two groups. The heads of each group have a head gap with a certain inclination giving rise to writing with an identical azimuth angle. Moreover, the azimuth angles of the heads of each of the two groups are opposed. In the case of using the same substrate, the heads of the two groups can be arranged head to tail, i.e. certain heads have their pole (i.e. the face intended to be positioned facing the recording medium) directed in one direction and the others have their pole directed in the other direction. In this case, the inclined head gaps have the same inclination in a common reference frame in the two groups of heads. When using two substrates, the latter are advantageously oriented in such a way that their crystal-lographic axes are parallel. Thus, the situation is the same as when using a single substrate. In all cases (use of one or two substrates) alongside each head of a group is provided a recess able to receive a head of the other group. By taking one head from a group, reversing it and applying it to the recess provided for this purpose alongside a head of the other group, a double head assembly is obtained. The reversing of a head has the effect of changing the sign of the inclination of its head gap and thus creating an azimuth angle opposite to that of the head which has not been turned, so that two juxtaposed heads are obtained with opposite azimuths. If the dimensions and location of the recesses are known, the two heads are automatically mutually positioned and oriented in their respective recesses.

The invention is applicable both when it is only wished to obtain a single double head and to the more frequent case where a collective process is to be carried out.

More specifically, in the case of an individual production, the process of the invention is essentially characterized in that it comprises the following operations:

on a first substrate is formed a first magnetic head with a first head gap having a certain inclination angle able to lead to a first azimuth angle,
on a second substrate, optionally coinciding with the first, is formed a second magnetic head having a second head gap with an inclination angle able to lead to a second azimuth angle opposite to the first,
alongside the first head is etched a first recess able to receive the second head and alongside the second head is etched a second recess able to receive the first head,
one of the heads is reversed,
the first head is fitted in the second recess and the second head in the first recess, so that their inclination angles are opposed in a common reference frame and lead to opposite azimuth angles,
the assembly obtained is joined together.

In the case of a collective production, the process of the invention is characterized in that it comprises the following operations:

on a first substrate is produced at least one array of a first group of first magnetic heads having a first head gap with a first inclination angle able to lead to a first azimuth angle,
on a second substrate, optionally coinciding with the first, is produced at least one counterarray of a second group of second magnetic heads having a second head gap with a second inclination angle able to lead to a second azimuth angle opposite to the first,
the first substrate of the array is etched so as to form, alongside the first heads, first recesses able to receive the second heads of the counterarray,
the second substrate of the counterarray is etched to form, alongside the second heads, second recesses able to receive the first heads of the array,
the counterarray is reversed and applied to the array, each second head of the counterarray being fitted into one of the first recesses of the array and each first head of the array being fitted into second recesses of the counterarray, so that the first and second inclination angles are opposed in a common reference frame and lead to first and second opposite azimuth angles,
the array and the counterarray are joined together,
the assemblies formed a first head and a second adjacent head are separated from one another, which give double heads with head gaps having opposite azimuths.

Advantageously, the first heads of the array and the second heads of the counterarray are placed in two parallel rows, head to tail and in staggered manner, the first and second inclination angles then being identical in a common reference frame prior to the reversing stage. This embodiment is particularly advantageous when the first substrate for producing the array and the second substrate for producing the counterarray are one and the same substrate.

This collective production process according to the invention is appropriate both for the production of double heads based on a treatment with arrays and based on a treatment with complete plates or boards.

DETAILED DESCRIPTION OF EMBODIMENTS

Although any magnetic head can be suitable for the invention, preference is given to the use of heads, whose conductor coil is of the solenoid type, as opposed to heads, whose coil is constituted by one or more flattened helical turns. The reason is that the lateral dimensions of the former are smaller than those of the latter and therefore it is possible to move the two heads closer together.

Figure 5:
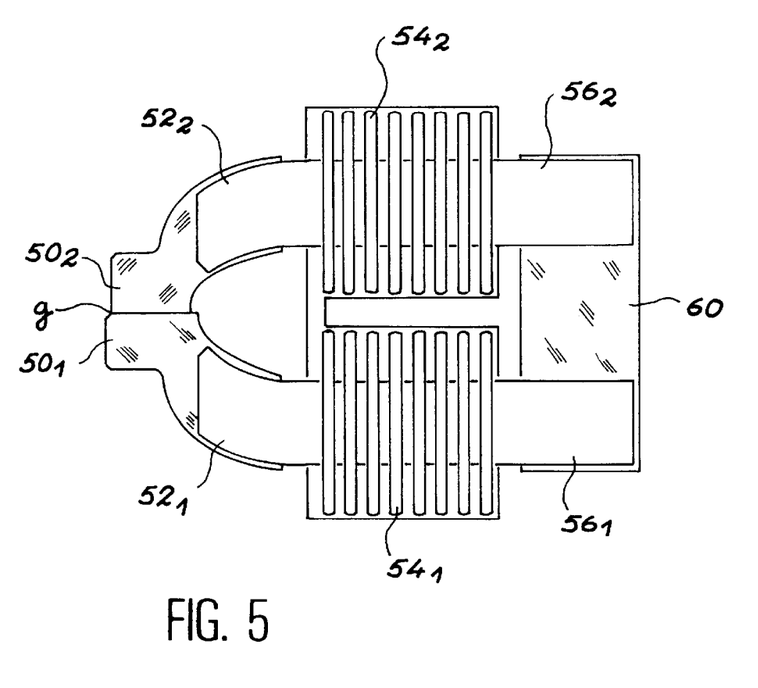
FIG. 5 diagrammatically illustrates in plan view a magnetic head with a coil wound around the magnetic circuit.
Figure 6:
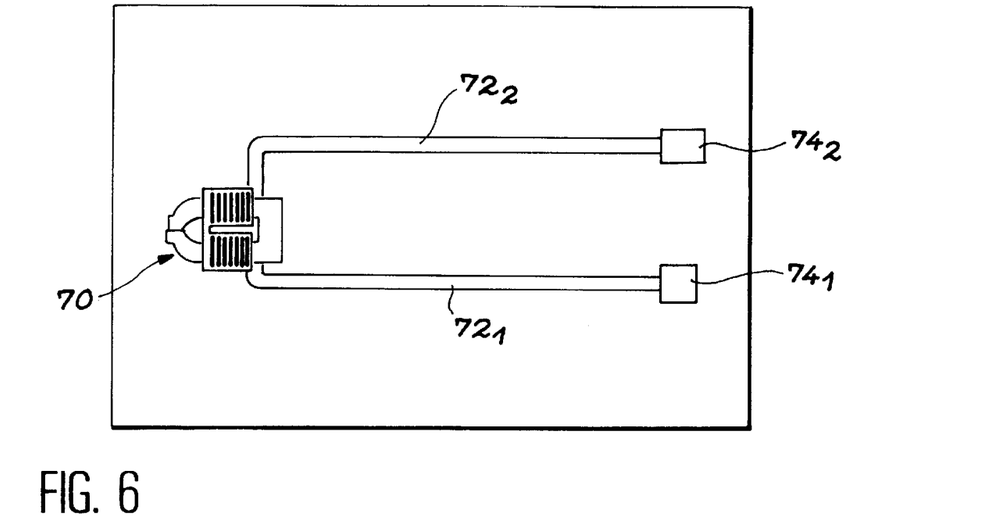
FIG. 6 diagrammatically illustrates in plan view a magnetic head with its coil connections and contact pieces.

FIGS. 5 and 6 diagrammatically illustrate an example of such solenoid heads. FIG. 5 shows in plan view a head with two pole pieces $50_1$, $50_2$ separated by an amagnetic head gap g, two lateral magnetic pieces $52_1$, $52_2$ and a rear magnetic flux closing piece 60. The conductor coil is constituted by two windings $54_1$, $54_2$ wound around two lateral pieces $52_1$, $52_2$.

FIG. 6 is an overall view of the head 70 and better reveals the electrical connection means giving access to the coil. These means are constituted by two conductor strips $72_1$, $72_2$ and two connection pieces $74_1$, $74_2$.

Figure 7:
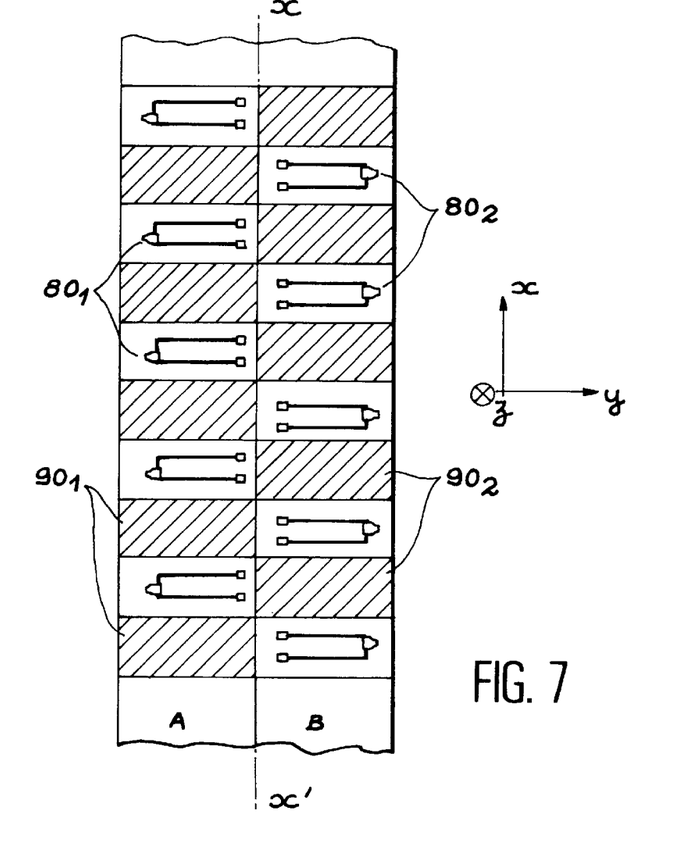
FIG. 7 diagrammatically illustrates the process of the invention.

The process for the collective production of double heads is diagrammatically illustrated in FIGS. 7 to 10 in the particular case of a single array and a single counterarray. FIG. 7 shows an array A and a counterarray B. The array A contains a plurality of first heads $80_1$ identical to the head of FIG. 6 and the counter-array B a plurality of second heads $80_2$ symmetrical to that of FIG. 6. Moreover, the array A contains a plurality of first blank locations $90_1$ and the counterarray B a plurality of second blank locations $90_2$ (said locations being hatched in FIG. 7).

Figure 8:
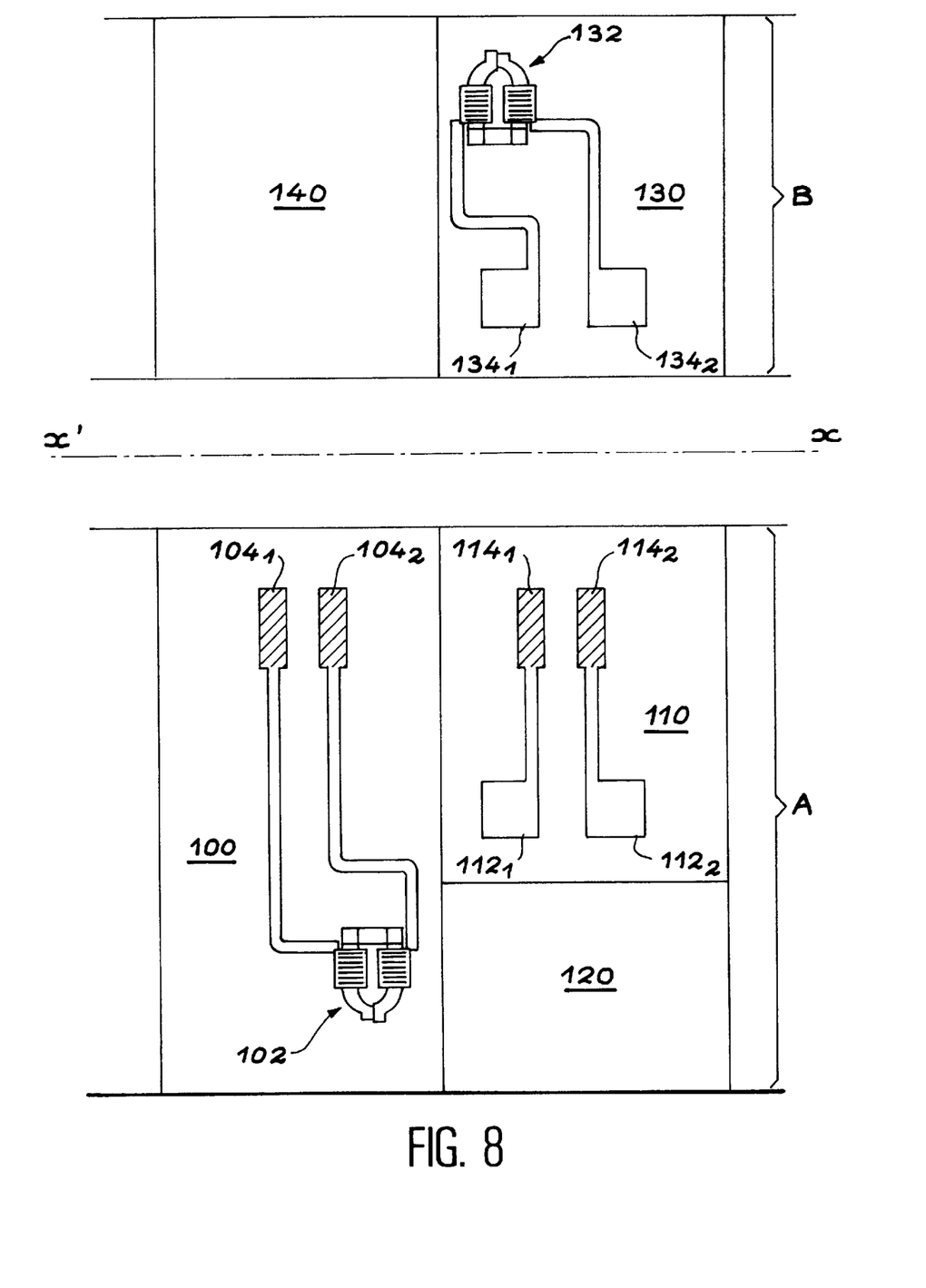
FIG. 8 shows in plan view the heads, connections, contact pieces and etchings of the array and counterarray.

In the embodiment illustrated in FIG. 8, the heads $80_1$ and $80_2$ are fitted head to tail and the heads and locations are arranged in staggered form.

Figure 9:
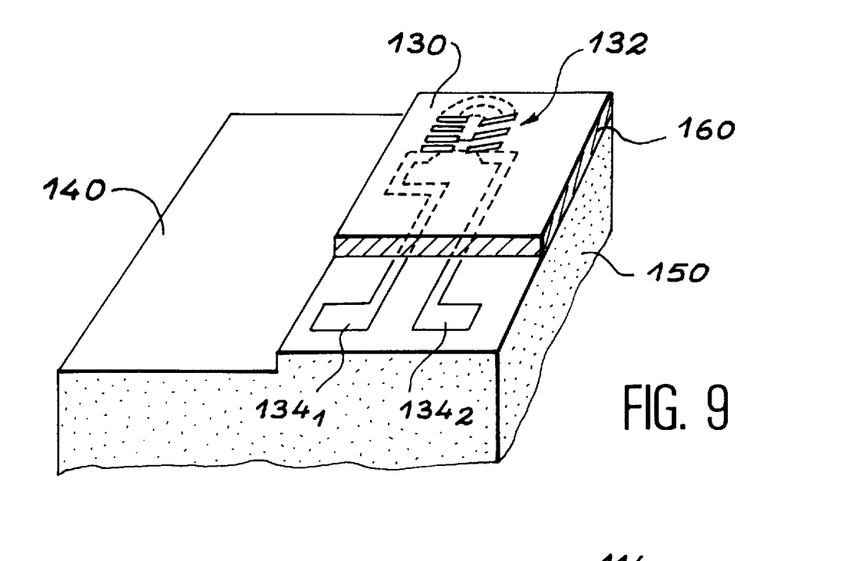
FIG. 9 shows in perspective part of the array and part of the counterarray.
Figure 10:
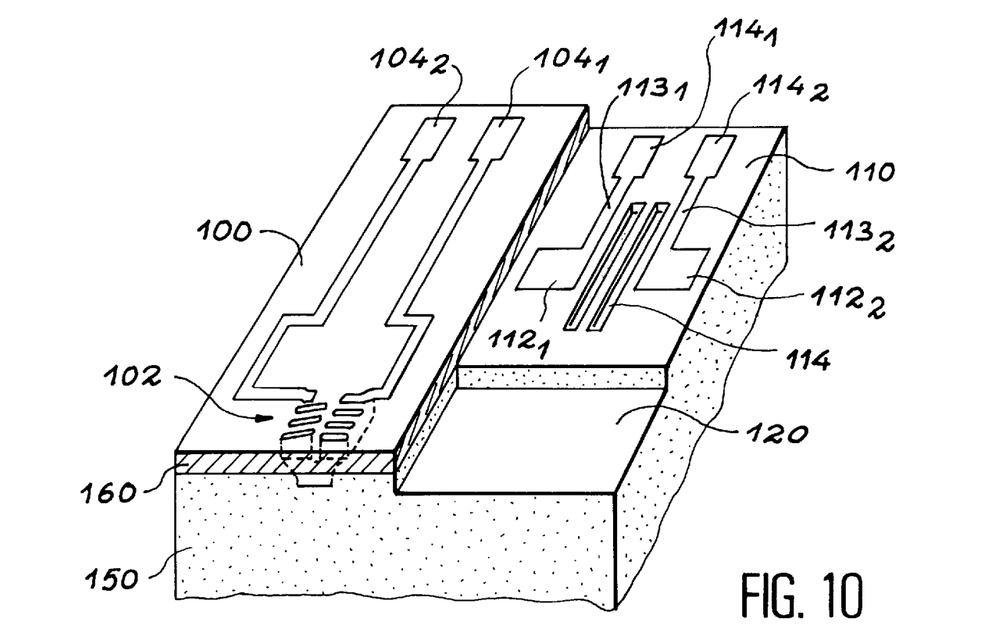
FIG. 10 shows the region of the azimuthed head gaps of a double head obtained by the process of the invention.

FIGS. 8, 9 and 10 show in greater detail the structure of the heads and the recesses made in the blank locations. These drawings are applicable both for an individual process and for a collective process.

FIGS. 8 and 10 show a first head 100 with an assembly 102 constituted by the magnetic circuit, the azimuthed head gap and the coil, as well as two contact pieces $104_1$, $104_2$.

A first etched recess 120 is located alongside said head. FIG. 10 better shows that the head 100 is formed on a first, e.g. silicon substrate 150 and covered by a layer of a first insulant 160, e.g. silica. The insulating layer 160 can e.g. have a thickness of 10 microns. To obtain the first recess 20, etching takes place both to the insulating layer 160 and the substrate 150, in the case of the latter e.g. over 10 microns, which forms in this particular case a recess of depth 20 microns.

on the counterarray B the same means are provided, namely a second head 130, with an assembly 132 constituted by a magnetic circuit, an azimuthed head gap identical to the head gap of the first head 102, and contact pieces $134_1$, $134_2$. A second recess 140 is positioned alongside the second head 130. FIG. 9 shows that said second head is formed on the substrate 150 supporting the first head and is covered by the same insulating layer 160. The recess 140 is obtained by etching the insulating layer 160 and the substrate 10 over 10 microns, which gives a recess of depth 20 microns, as for the first recess 120. Thus, the reliefs and depressions of these two subassemblies are complimentary.

FIGS. 9 and 10 illustrate a special embodiment making it possible to bring the connections of the second head 130 onto the same face as those of the first head 100. In this embodiment, the counterarray has a smaller width than the array. To bring about said connection transfer, a step at an intermediate level is made on the array A and carries the reference 110 in FIGS. 8 and 10. In the illustrated embodiment, it is at 10 microns below the upper level, i.e. at the surface of the substrate 150. On said step 110 are formed contact resumption pieces $112_1$, $112_2$, whose spacing corresponds to the spacing of the connection pieces $134_1$, $134_2$ of the second head (cf. FIG. 9). These contact resumption pieces $112_1$, $112_2$ are connected by connection tracks $113_1$, $113_2$ to contact pieces $114_1$, $114_2$ positioned alongside the pieces $104_1$, $104_2$ of the first head.

On the counterarray the second substrate 150 is etched so as to form, alongside the second heads 130, second recesses 140 able to receive the first heads 100 of the array A.

After reversing the second head 130 and introducing it into the first recess 120, the pieces $134_1$, $134_2$ come into contact with the contact resumption pieces $112_1$, $112_2$, so that the connection pieces of the second head, once in place, will be transferred to the pieces $114_1$, $114_2$.

The step 110 can also contain grooves 114 to absorb any surplus adhesive used for joining together the two parts. The adhesive can be a conductive adhesive and to it can be added conductive balls, which will be crushed during the fitting together and will ensure a good electrical contact between the pieces $134_1$, $134_2$ and $112_1$, $112_2$.

Figure 11:
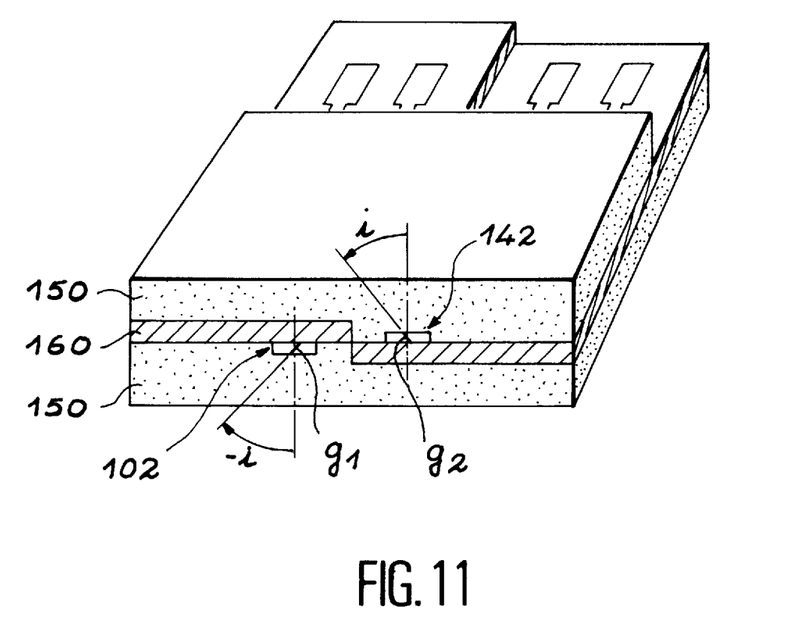
FIG. 11 shows the assembly obtained after reversing and fitting together the two arrays.

After reversing by rotating by an angle $\pi$ of the counterarray B about the axis xx' (FIG. 7) and fitting together the two arrays, the assembly shown in FIG. 11 is obtained. It is possible to see a first head 102 with its azimuth gap $g_1$, placed on the substrate 150 and covered with the insulating layer 160, as well as a second head 142 and its gap $g_2$ azimuthed in the opposite direction, with its reversed substrate 150 and reversed insulating layer 160. The two parts are fitted in one another and as they are complimentary to one another they form a one-piece head.

The thus obtained assembly will then be cut to separate the one-piece double heads in the case of a collective treatment (e.g. complete plate or arrays). Each head then comprises a silicon block enclosing in its centre a double head. Each head can then be machined by conventional micromechanical operations in order to give it the desired shape. Obviously the heads can also be cut prior to assembly.

In the embodiment described hereinbefore, it is possible to use one substrate for producing the array and the counterarray. This variant is advantageous, because it permits the obtaining of uniform characteristics for the different heads, particularly for those facing one another. However, it would naturally be possible to separate the production of the array and the production of the counterarray.

The above description has made it clear that the invention leads to numerous advantages.

It permits a collective production of one-piece, azimuthed double heads with a thin film on silicon technology, associated with a few mechanical assembly stages, array by array or plate by plate, the cost gain being significant in mass production.

It solves the angular and lateral alignment problems for one head with respect to the other by defining the assembly reference planes by extremely precise microelectronics etching processes. The adhesive joint between the two parts to be assembled may not exceed a few tenths of a micrometre, which can be well within the tolerances of the systems in question, both with regards to the angle introduced between the two heads and the lateral deviation (leading to an error on the track width of the signal).

The installation of a one-piece double head obtained by the invention in a recording system becomes just as simple as the installation of a single head, thus reducing the costs of said operation in a corresponding way.

The uniformity of the characteristics of the heads is excellent, when the two assembled heads were adjacent to one another during their production on silicon.

Finally, the good tribological properties of the silicon encapsulating the heads will lead to gentle, regular wear to the latter during their life.

We claim:

1. A process for producing a double magnetic head having two head gaps with opposite azimuths, said process comprising the steps of:

forming, on a first substrate, a first magnetic head with a first head gap having a first inclination angle;

forming, on a second substrate, a second magnetic head having a second head gap with a second inclination angle;

etching, along side said first head, a first recess for receiving said second head;

etching, along side said second head, a second recess for receiving said first head;

reversing one of said first and second heads;

fitting said first head in said second recess and fitting said second head in said first recess whereby said first and second inclination angles are opposed in a common reference frame and provide opposite sign but equal magnitude first and second azimuth angles.

2. A process for collective production of double magnetic heads with head gaps and opposite azimuths, said process comprising the steps of:

producing, on a first substrate, at least one array of a first group of first magnetic heads having a first head gap with a first inclination angle;

producing, on a second substrate, at least one counterarray of a second group of second magnetic heads having a second head gap with a second inclination angle;

etching the first substrate of the array to form, along side the first group of first magnetic heads, first recesses for receiving the second group of second magnetic heads of the counterarray;

etching the second substrate of the counterarray to form, along side the second group of second heads, second recesses for receiving the first group of first heads of the array;

reversing the counterarray and applying said counterarray to the array wherein each said second head of the counterarray is fitted into one of the first recesses of the array and each first head of the array is fitted into second recesses of the counterarray whereby the first and second inclination angles are opposed in a common reference frame and provide first and second opposite azimuth angles;

joining together said array and said counterarray to form an assembly providing a first head and a second adjacent head separated from one another to provide said double magnetic heads with said head gaps having opposite azimuths.

3. The process according to claim 2, wherein the first heads of the array and the second heads of the counterarray are placed in two parallel rows, head to tail and in a staggered manner and wherein the first substrate which provides the array and the second substrate which provides the counterarray are one and the same substrate.

4. The process according to claim 2, wherein the array and the counter array are joined together by adhesion.

5. The process according to claim 2, further comprising the steps of:

placing the first heads of the array in a first insulating layer formed on the first substrate;

placing the second heads of the counterarray in a second insulating layer formed on the second substrate;

etching the first insulating layer and the first substrate to form first recesses; and etching the second insulating layer and the second substrate to form second recesses with the array and the counterarray having complementary profiles fitting into one another.

6. The process according to claim 2, wherein said first magnetic heads are produced by a first magnetic circuit and a first conductor coil wound around a portion of said first magnetic circuit and said second magnetic heads are produced with a second magnetic circuit and a second conductor coil wound around a portion of said second magnetic circuit.

7. The process according to claim 6, further comprising the steps of:

etching the second insulating layer of the counterarray in order to free connection pieces of the second coil of the second heads;

etching at least one of the first insulant and the first substrate of the array to form a step to a depth level lower than a depth of said first recesses;

forming contact resumption pieces on said step of said array wherein a spacing of said resumption pieces corresponds to the connection pieces of the second coil of the second heads of the counterarray whereby when the counterarray is reversed and applied to the array, the connection pieces of the second heads provide electrical contact with the contact resumption pieces of the array; and forming second connection pieces on said step wherein the connection pieces of the first heads and the second connection pieces of the second heads are located on the same side and on the same face of said double head.

8. The process according to claim 7, further comprising the step of forming grooves on said step.

* * * * *